United States Patent

Depp et al.

Patent Number: 6,026,709
Date of Patent: Feb. 22, 2000

[54] DEVICE FOR DAMPING OSCILLATIONS OF A CRANKSHAFT

[75] Inventors: Jürgen Christian Depp; Matthias Schell, both of Michelstadt, Germany

[73] Assignee: Palsis Schwingungstechnik GmbH & Co., Ahlen, Germany

[21] Appl. No.: 09/030,569

[22] Filed: Feb. 25, 1998

[30] Foreign Application Priority Data

Feb. 28, 1997 [DE] Germany ............... 197 08 082

[51] Int. Cl.$^7$ ............ F16F 15/22; F16F 15/10; G05G 1/00

[52] U.S. Cl. ............ 74/573 F; 74/572; 74/573 R; 474/94; 474/166; 464/28; 464/180

[58] Field of Search ............ 74/572–574; 474/94, 474/903, 166, 191; 29/897.2, 527.1; 464/28, 180, 67

[56] References Cited

U.S. PATENT DOCUMENTS

| | | | |
|---|---|---|---|
| 4,050,195 | 9/1977 | Hofmann | 74/573 F X |
| 4,655,728 | 4/1987 | Shimada | 464/28 |
| 4,710,152 | 12/1987 | Ichikawa et al. | 474/166 |
| 4,781,659 | 11/1988 | Gebhardt | 474/94 |
| 4,815,332 | 3/1989 | Serizawa et al. | 74/573 R |
| 5,050,446 | 9/1991 | Takashima et al. | 74/574 |
| 5,058,267 | 10/1991 | Andra et al. | 29/897.2 |
| 5,324,237 | 6/1994 | Bilsing et al. | 474/94 |
| 5,393,266 | 2/1995 | Braun et al. | 464/67 |
| 5,720,205 | 2/1998 | Harrington et al. | 74/573 F |

FOREIGN PATENT DOCUMENTS 4328596  3/1995  Germany .

*Primary Examiner*—Vinh T. Luong
*Attorney, Agent, or Firm*—Brown & Wood, LLP

[57] ABSTRACT

A device for damping crankshaft oscillation including a ring-shaped housing filled with viscous or elasticoviscous fluid and fixedly mounted on the hub, a flywheel located in the ring-shaped housing, and a torsionally elastic coupling for connecting a torque-transmitting member with the hub and arranged parallel with the flywheel.

4 Claims, 4 Drawing Sheets

DEVICE FOR DAMPING OSCILLATIONS OF A CRANKSHAFT

BACKGROUND OF THE INVENTION

1. Field of the Invention

The present invention relates to a device for damping oscillation of a crankshaft and including a hub fixedly mountable on the crankshaft, a flywheel connected to the hub, and a torque-transmitting element, in particular, a belt pulley.

2. Description of the Prior Art

Damping devices of the type described above are primarily used for quenching or damping of high frequency crankshaft oscillations. Auxiliary apparatuses, which are driven by an internal combustion engine, such as generators, cooling water pumps, as a rule, are driven by V-belts or so-called multi-V-shaped belts. The auxiliary apparatuses are driven either by the oscillation dampers (the belt track forms a component of an oscillation damper), or by separate belt pulleys, or by belt pulleys with a torsionally elastic coupling. The torsionally elastic coupling serves for isolating the belt drive from oscillations resulting from large amplitudes of the crankshaft rotational angle observed in the region of small rotational speeds of an internal combustion engine (which are associated with functional rotational irregularities of piston engines). To this end, the spring characteristic of the coupling should be made so flexible that a torsional oscillation system, which is formed by the coupling and the auxiliary apparatus, has a very low first fundamental frequency. For engines and small diesel engines, these torsional oscillation dampers are formed usually as elastically suspended dampers in which both elastic and damping characteristics are provided by a rubber spring. This rubber damper is formed primarily of a hub connectable with a crankshaft, one or two rubber springs and one or two balance weights. The rubber springs can be provided in a bound form (be vulcanized or bonded) and a non-bound form (be pressed on), or be glued. The functioning of the rubber damper is based on a combination of quenching and damping.

However the power of these rubber dampers is not sufficient, e.g., for large Diesel engines. With these engines, co-called viscous dampers are used. The viscous dampers are based on a physical principle of shear flow of liquid in an annular clearance between a balance weight and a housing which is connected with the crankshaft and in which the balance weight is arranged. The freely rotatable balance weight, as a result of its rotational inertia, slows down the movement of the housing. With that, the energy necessary for shearing the viscous fluid in the clearance is reduced and, therefore, the oscillations are damped.

A device of this type is disclosed in German publication DE-43 28-596A1. This publication describes a torsional damper formed as a rubber damper connected seriesly with or parallel to a viscous coupling for decoupling of a belt drive of an auxiliary apparatus. This coupling has a backlash, and the damper includes a rubber spring. Because of a noticeable difference of rotational speeds between the belt pulley and the crankshaft and because of the losses, which are caused by this difference, the device described in this German publication is not economical and, moreover, could hardly be realized from the thermal point of view.

Accordingly, an object of the present invention is a damping device capable of reducing high frequency torsional vibrations of a crankshaft and, at the same time, capable of isolating low frequency oscillation without significant losses.

SUMMARY OF THE INVENTION

This and other objects of the present invention, which will become apparent hereinafter, are achieved by providing a device for damping oscillations of a crankshaft in which the belt pulley is connected with the hub by a torsionally elastic coupling, and the flywheel is located in a ring-shaped housing which is filled with an elasticoviscous fluid and which is secured to the hub, with the flywheel being arranged parallel to the coupling.

The torsionally elastic coupling operates blacklash-free. The damper is formed as a viscous damper which provides for reduction of high frequency torsional oscillation of the crankshaft. The combination of a torsionally elastic coupling with a viscous damper permits to isolate a belt drive for an auxiliary apparatus in engines which (because of their high torques and power) require the use of viscous dampers for reduction of torsional oscillations.

According to an advantageous embodiment of the inventive damping device, the torsionally elastic coupling is formed as a rubber coupling. The advantage of this consists in that proven rubber-metal structures, such as rotationally prestressed cartridge rubber springs or torsionally prestressed curved rubber washers can easily recover.

Alternatively, a PU-spring can be used or any other torsionally elastic coupling. It is further contemplated to form the resiliently deformable elements, at least partially, of a compressible, if necessary, porous plastic material, and/or from a foam material, and/or of rubber sponge, as per se known.

To be able to manufacture the device with a minimum of different manufacturing steps, it is advantageously contemplated to form the hub and the housing as a one-piece part.

Alternatively, the hub and the housing can be formed as separate parts fixedly or releasably connected with each other. The connection is effected in the region of axial and/or radial abutting surfaces of the two parts by welding, gluing or by other connecting means (fixedly or realeasably).

It is further contemplated to provide a bearing between an outer surface of the housing or the hub and the inner surface of the belt pulley. Likewise, a bearing for supporting the flywheel is provided inside the housing. In the latter case, e.g., a sliding bearing can be used to provide for axial and radial support of the flywheel.

From an acoustic point of view, it is advantageously contemplated to provide another, rubber oscillation damper mounted either on the hub or the housing.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENTS

Figure 1:
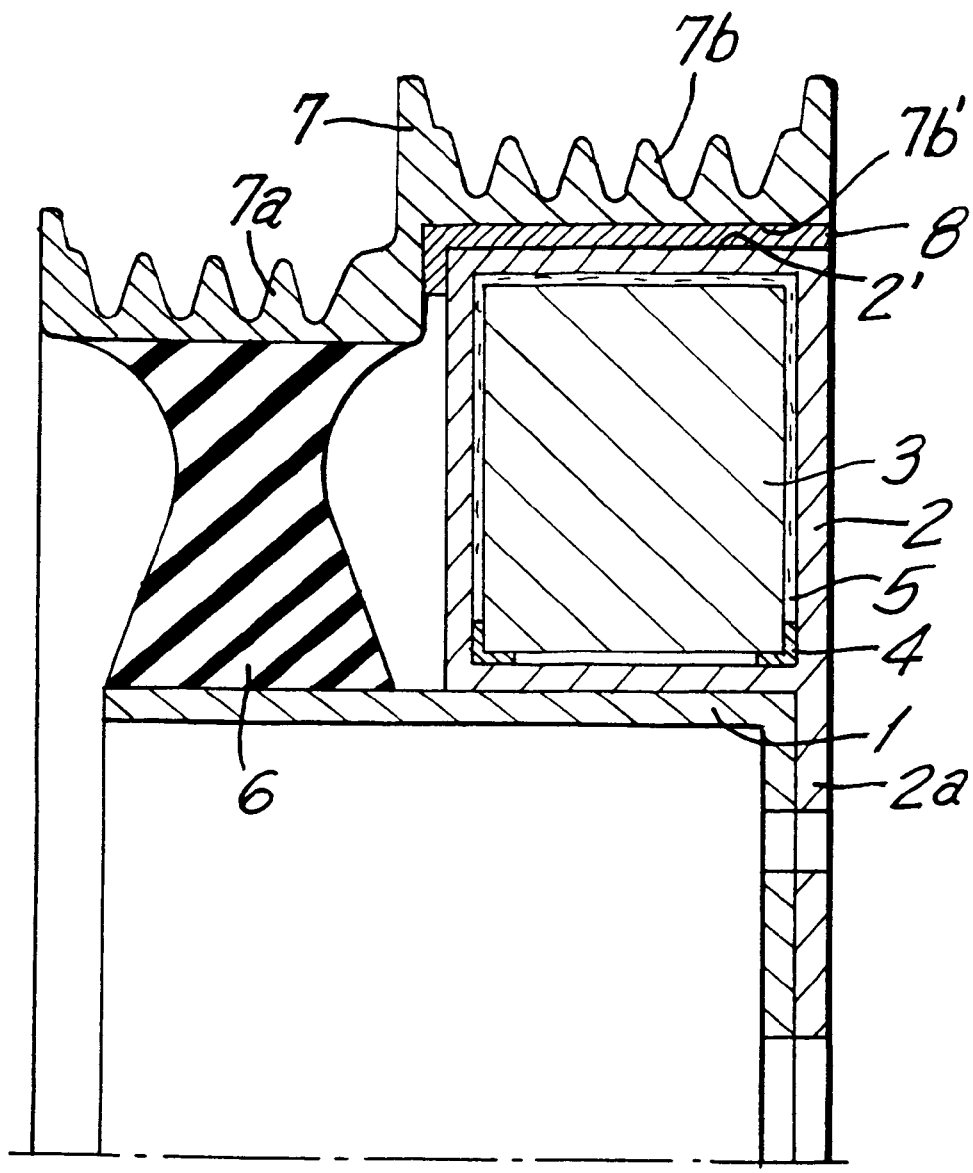
FIG. 1 shows a cross-sectional view of a first embodiment of a device for damping oscillation of a crankshaft according to the present invention.

A damping device according to the present invention, which is shown in FIG. 1, includes a pot-shaped hub 1 which is designed to be flange-mounted at an end of a crankshaft (not shown in detail). A ring-shaped housing 2 is mounted on the circumference of the hub 1. The ring-shaped housing 2 can either be formed as one-piece with the hub 1 or, as shown in FIG. 1, can be formed as a separate part and be fixedly connected with the hub 1 by gluing, welding and the like. The housing 2 may have a web 2a extending radially inward with which it can additionally be screwed to the hub 1. A flywheel 3 is located inside the housing 2. The flywheel 3 is radially supported in the housing 2 with a bearing 4. The remaining inner space of the housing 2 is filled with a viscous or elasticoviscous fluid 5. The fluid-filled space of the housing 2 is designated with a reference numeral 5'. The housing 2, together with the flywheel 3 located therein, forms a viscous damper of a damping device according to the present invention.

A torsionally elastic coupling 6 is mounted on the hub 1 parallel with the viscous damper. The coupling 6 can be formed, e.g., as a rubber coupling. The rubber coupling, coupling 6, can, e.g., be vulcanized on the hub 1 or be mounted thereon in another similar manner.

This torsionally elastic coupling 6 serves for isolating the belt drive from oscillations caused by rotational irregularity of the internal combustion engine at small rotational speeds.

The radial outer circumference of the rubber coupling 6 supports a belt pulley 7 having, in the embodiment shown in FIG. 1, two multi-shaped regions 7a and 7b. The region 7a is arranged in the region of the coupling 6, whereas the belt pulley region 7b is arranged in the region of the viscous damper. At that, a bearing, e.g., a sliding bearing 8 is provided between the inner surface 7b of the belt pulley region 7b and the outer surface 2' of the ring-shaped housing 2 of the viscous damper.

Thus, a viscous damper, with a decouplable belt pulley is provided. The viscous damper serves for reducing high frequency torsional oscillation and connects, via the rubber coupling 6, the hub 1 with the belt pulley 7 backlash free. At that, the rubber coupling 6 and the viscous damper are mounted on the hub 1 parallel to each other.

Figure 2:
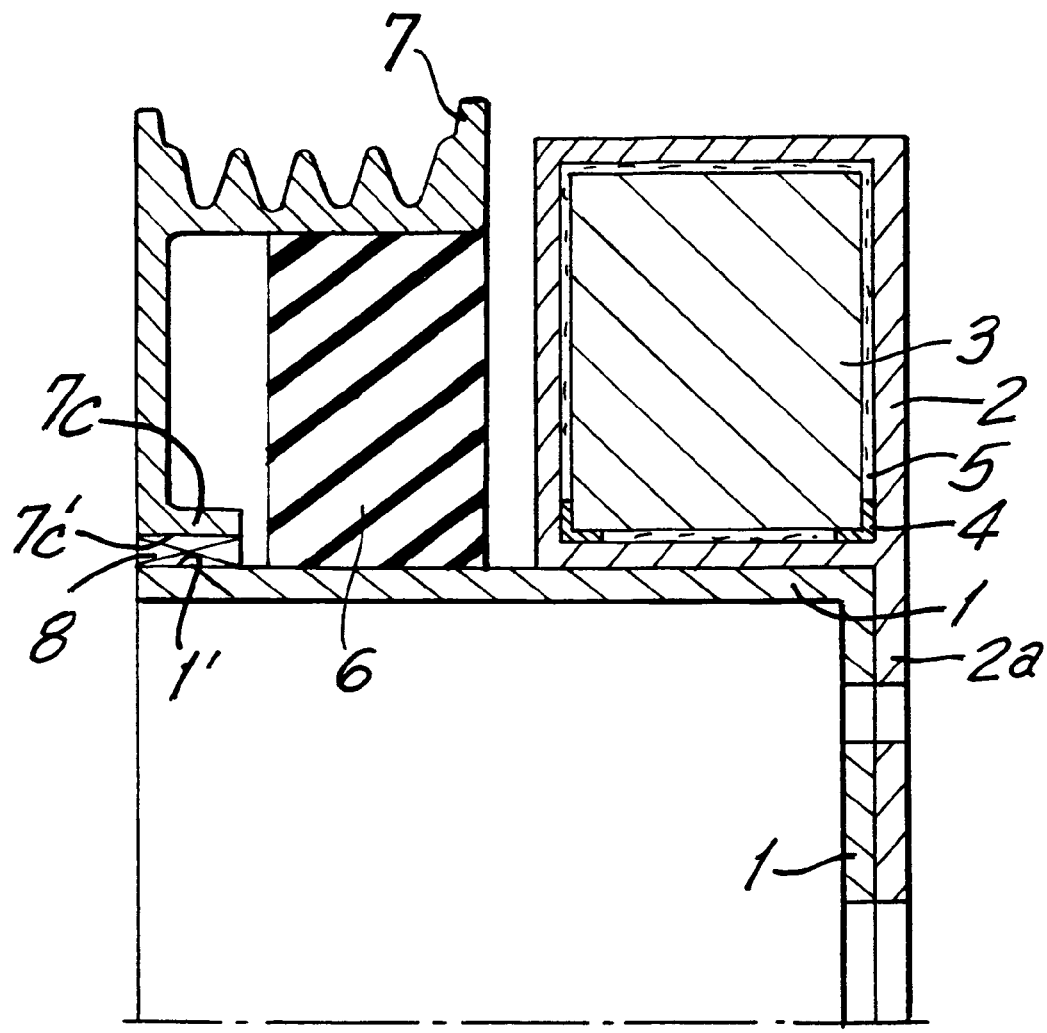
FIG. 2 shows a cross-sectional view of a second embodiment of a device for damping oscillation of a crankshaft according to the present invention.

FIG. 2 show a second embodiment of a damping device according to the present invention. In FIG. 2, the same reference numerals are used for designating identical parts.

In contrast to the embodiment of FIG. 1, the belt pulley 7 is associated with the rubber coupling but is not supported on the housing 2. Rather, it is supported on the hub 1. To this end, the belt pulley 7 is provided with an inner web 7c supported on the hub 1 by a sliding bearing or a rolling bearing 8 provided between the outer surface 1' of the hub 1 and the inner surface 7'c of the inner web 7c.

The sliding bearing 4, which is provided in the housing 2, is formed of PTFE-strips or PEEK-angles, or a coated flywheel may be used. Alternatively, a rolling bearing can be used.

Figure 3:
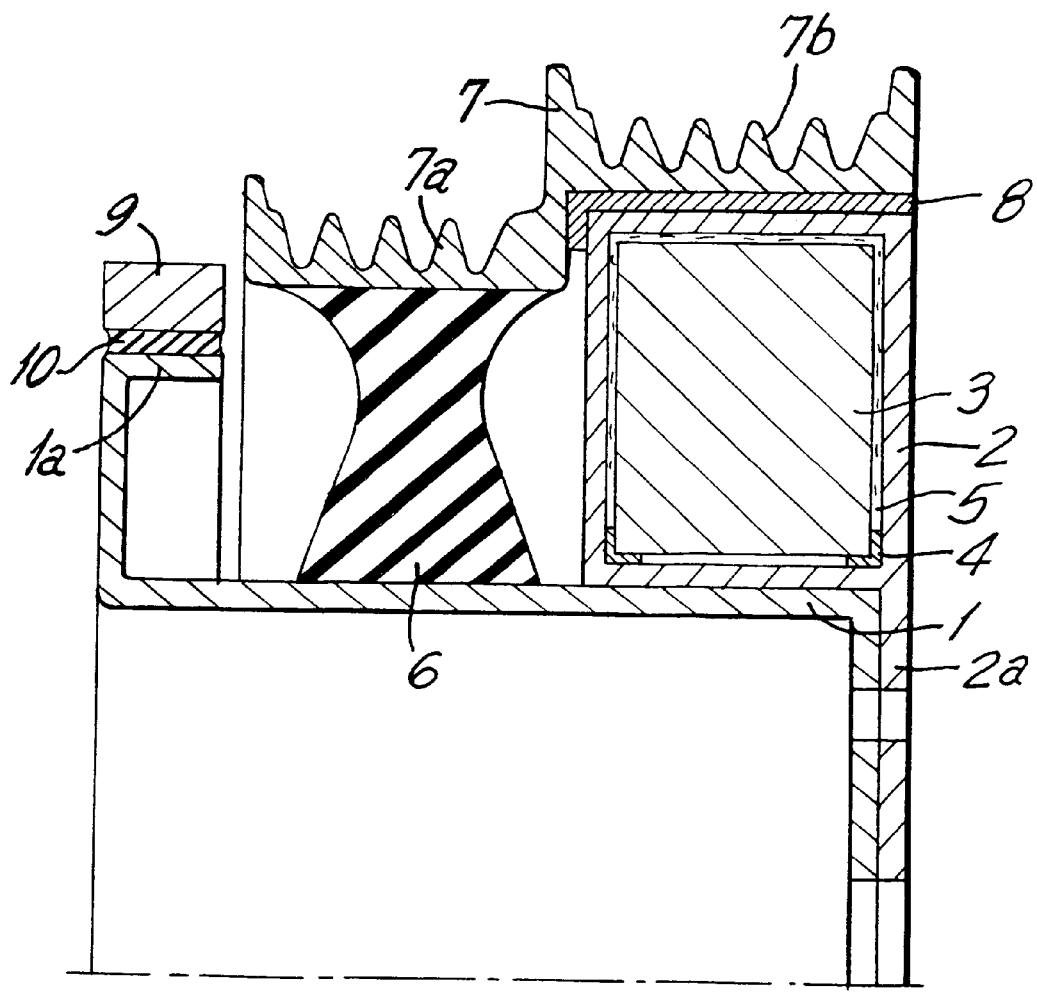
FIG. 3 shows a cross-sectional view of a third embodiment of a device for damping oscillation of a crankshaft according to the present invention, which is many respect is similar to that of FIG. 1.

The embodiment of a damping device shown in FIG. 3 represents a modification of the device shown in FIG. 1. In FIG. 3 likewise, the same reference numerals are used for designating the parts identical with those of the previously discussed embodiments of the inventive damping device.

In the embodiment of a damping device shown in FIG. 3, an additional rubber oscillation dumper is mounted on the hub 1. This rubber oscillation damper is formed of a second flywheel 9 which is supported on the hub 1 with a rubber ring 10 which can be vulcanized on the hub 1 or be arranged on a radially outwardly extending hub portion 1a.

Figure 4:
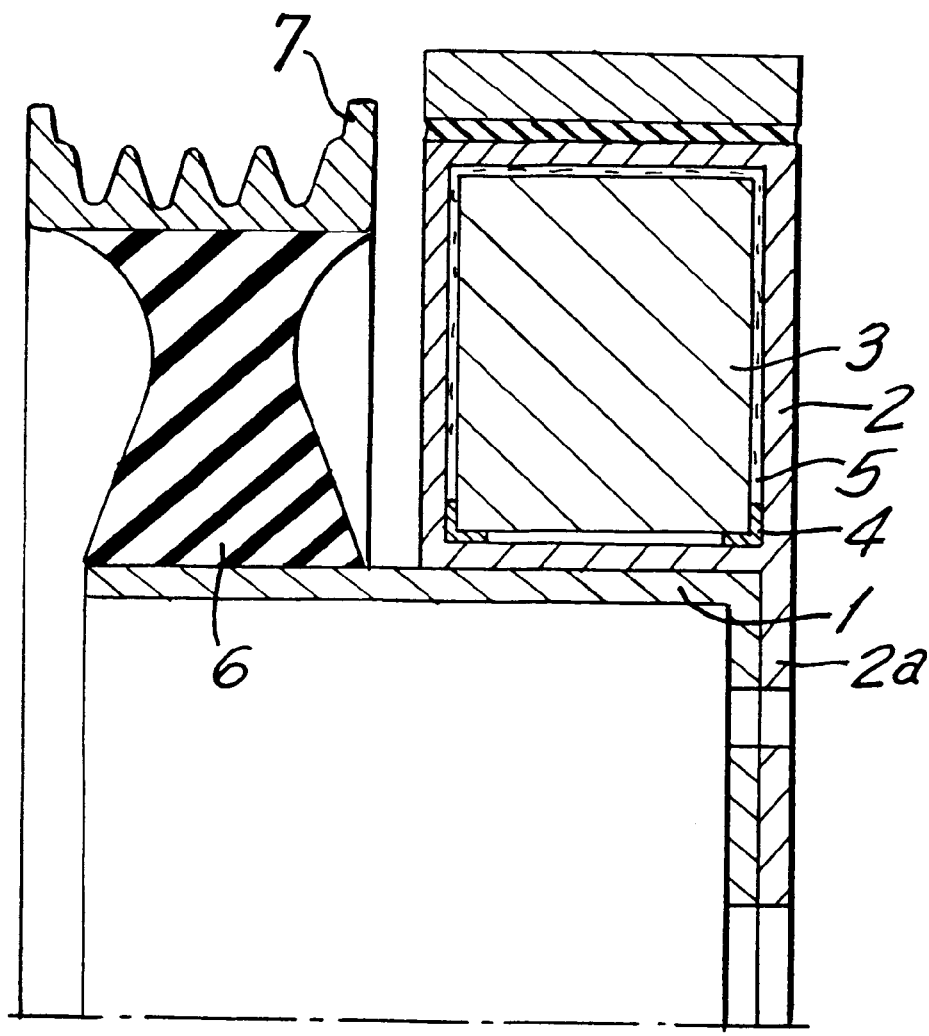
FIG. 4 a cross-sectional view of a fourth embodiment of a device for damping oscillation of a crankshaft according to the present invention.

A still further embodiment of a damping deice according to the present invention is shown in FIG. 4 in which the parts identical with those of the previously discussed embodiments are likewise designated with the same reference numerals. In the embodiment of the damping device shown in FIG. 4, the second flywheel 9 is mounted not on the hub 1 but is supported on the outer circumference of the housing 2 by a further rubber ring 10. This rubber oscillation damper is particularly advantageous from an acoustic point of view.

Further modification of an oscillation damper according to the present invention may include, e.g., a substitution of a simple V-shaped pulley for the multi-V-shaped pulley, the use of a transverse toothing and the like.

Accordingly, though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A device for damping oscillations of a crankshaft, comprising:

a hub for being mounted on the crankshaft;

a ring-shaped housing filled with one of viscous fluid and elasticoviscous fluid and fixedly mounted on the hub;

a flywheel located in the ring-shaped housing;

a torsionally elastic coupling for connecting a belt pulley, which transmits a torque to the crankshaft, with the hub and arranged parallel with the flywheel; and bearing means to be mounted between at least one of outer surface of the housing and an outer surface of the hub and an inner surface of the belt pulley.

2. A device according to claim 1, wherein the torque-transmitting member is a belt pulley.

3. A device according to claim 1 wherein the torsionally elastic coupling comprises a rubber coupling.

4. A device according to claim 1, wherein the hub and the housing are formed as two separate parts.

* * * * *